United States Patent [19]

Shindow

[11] 4,348,108
[45] Sep. 7, 1982

[54] AUTOMATIC LENS METER

[75] Inventor: Osamu Shindow, Tokyo, Japan

[73] Assignee: Asahi Kogaku Kogyo Kabushiki Kaisha, Tokyo, Japan

[21] Appl. No.: 215,704

[22] Filed: Dec. 12, 1980

[30] Foreign Application Priority Data

Dec. 24, 1979 [JP] Japan .................... 54-166835

[51] Int. Cl.$^3$ .................................... G01B 9/00
[52] U.S. Cl. .............................. 356/125; 356/127
[58] Field of Search ................ 356/124, 125, 126, 127

[56] References Cited

U.S. PATENT DOCUMENTS 3,870,415  3/1975  Cornsweet .................... 356/124
4,182,572  1/1980  Humphrey .................... 356/127

FOREIGN PATENT DOCUMENTS 54-14757  2/1979  Japan .
54-14758  2/1979  Japan .

*Primary Examiner*—R. A. Rosenberger
*Attorney, Agent, or Firm*—Fleit & Jacobson

[57] ABSTRACT

An automatic lens meter for measuring a pherical power, a cylinder power, an angle of cylinder axis, and a power of prism of an ophthalmic lens. The automatic lens meter is characterized by the use of a shading device to obtain the coordinates of the points at which respective light rays emitted from respective pin-holes of a multiple-pin-hole disc cross the second focal plane of an objective lens, according to a shading time lag among respective light rays. The shading device comprises a pair of deviated prisms respectively having substantially an equal apical angle, and disposed at a given spacing from each other between a lens set having an objective lens and a collector lens, with the apical angle of one prism directed opposite to that of the other vertically with respect to the optical axis; a rotary mechanism for rotating the pair of deviated prisms about the optical axis of the lens set at a given rate; a device for reading an angle of rotation of the pair of deviated prisms; and, a shading disc disposed at the rear of the pair of deviated prisms on the second focal point of the objective lens, and having opaque portions and transparent portions defined by two lines crossing at a right angle to each other at a point on the optical axis of the lens set.

1 Claim, 6 Drawing Figures

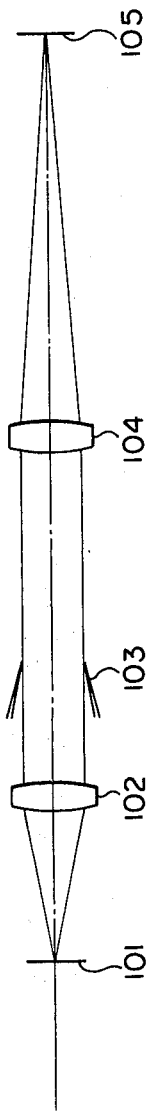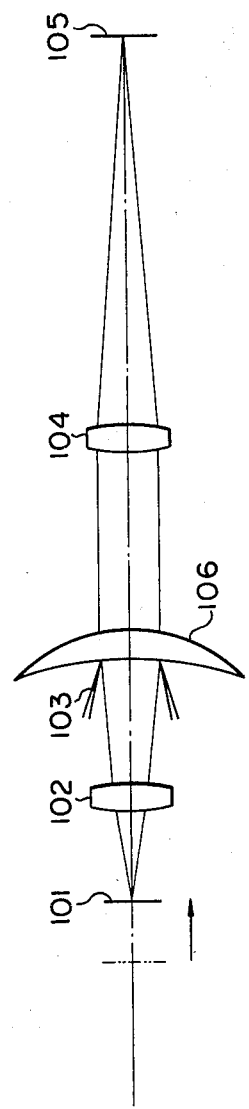
FIG. 1(a)
FIG. 1(b)

AUTOMATIC LENS METER

BACKGROUND OF THE INVENTION

1. Field of the Invention

This invention relates to an automatic lens meter for measuring a spherical power, a cylinder power, an angle of cylinder axis and a power of prism of an ophthalmic lens.

2. Description of the Prior Art

Description will start with a principle of a telescopic lens meter and a projection-type lens meter, with reference to FIG. 1. Lenses 102 and 104 are disposed on the same optical axis at a spacing from each other. A lens stop 103 for holding thereon a lens 106 being inspected is placed between the lenses 102 and 104. A target 101 is placed at the left of the lens 102 in FIG. 1, and an image forming plane 105 is set on the second focal point of the lens 104. The flux of light from the target 101 becomes parallel between the lenses 102 and 104, and then the light transmitted through the lens 104 is focused onto the image forming plane 105 to form an image of the target 101, as seen in FIG. 1(a).

When the lens 106 being inspected is placed on the lens stop 103, as shown in FIG. 1(b), then the flux of light can no longer be parallel between the lenses 106 and 104, and hence no image is formed on the image forming plane 105. In order to form an image of the target 101 clearly on the image forming plane 105, the target 101 must be shifted along the optical axis. The length of shift of the target 101 has a linear relationship with the spherical power of the lens 106 being inspected. The spherical power of the lens being inspected is obtained by reading the length of shift of the target 101.

In the telescopic lens meter, a reticle is placed on the image forming plane 105; an image of the target 101 is focused onto the reticle, and the image thus formed on the plane is observed by a magnifier. In the projection-type lens meter, a diffused plate is placed on the image forming plane 105, and an image of the target is observed through the diffused plate.

In the telescopic lens meter, since the image of the target 101 formed on the reticle is observed in the form of an aerial image by means of the magnifier, the improper adjustment of the visibility leads to reading error. Furthermore, if a lens meter operator should have astigmatism in his eyes, it would be observed as if a spherical lens has a cylinder power. This is due to the fact that the optical system of the lens meter is joined coherently to the optical system of the operator's eyes, and the local performance of the optical system of the operator's eyes, which permits transmission of the flux of light emitted from the lens meter, largely influences how the image of the target 101 is seen.

Regarding the projection-type lens meter, since the flux of light from the target 101 is projected on to the diffused plate; the image of the target 101 is observed over the entire zone of the pupils of the operator's eyes, and hence the local performance of the optical system of one's eyes has only a little influence on how the image is observed. Yet, there remains an influence of abberrations occurring over the entire zone of the pupils of the eyes.

Description is proceeded on the measurement of a ophthalmic lens having a cylinder power by means of the telescopic lens meter or the projection-type lens meter. In this case, either type lens meter can produce the same results. To the effect that a refractive power for a principal meridian is obtained, the target 101 is shifted along the optical axis, and at the same time, the target 101 is turned about the optical axis, in a kind of lens meter. The shift and rotation of the target 101 on the optical axis are repeated, so that, based on the length of shift of the target 101 and an angle of rotation thereof, the refractive power for the principal meridian and directions thereof are respectively obtained. In a lens meter in which the turning of the target 101 is not permitted, the reticle is rotated to coincide the reticle line with a direction of flux of an image of the target 101, and an angle of rotation of the reticle is read by means of a graduation panel attached to the reticle, whereby an operator can know a direction of the principal meridian.

In order to obtain a refractive power for another principal meridian rectangular to the aforesaid principal meridian, the target 101 again shifted to a proper point. Based on the two refractive powers and directions of two principal meridians thus obtained, the spherical power, cylinder power and an angle of cylinder axis are determined according to a known calculation formula.

The telescopic-type lens meter and the projection-type lens meter all use the eyesight of an operator, thus resulting in a difference in measurement among individuals. Furthermore, such lens meters are hard to operate, and hence require skill.

To cope with the above drawbacks, an automatic lens meter comes to practical use. One such lens meter is disclosed in U.S. Pat. No. 3,870,415. In the automatic lens meter disclosed therein, laser beam have been used for a light source, so that the laser beam are caused to circularly scan on a lens being inspected by means of a little deviated prism rotation at a given rate. The beam refracted by the lens being inspected scan on a ruling rotating at a predetermined speed, and the frequency of the light chopped by the ruling is sensed and counted by a sensor disposed at the rear of the ruling, whereby the spherical power inspected, the cylinder power and the agnel of cylinder axis, of the lens being inspected, are calcualted.

Other automatic lens meters are disclosed in Laid-open Japanese Patent Publications No. 50-14757 and 54-14758. These automatic lens meters are such that the flux of light from four light sources separated by prisms are shielded by a shading means having a special pattern thereon and rotating at a predetermined rate, and the light thus shielded is caused to enter a lens being inspected. Among the flux of light rays refracted from the lens being inspected, the light rays parallel to the optical axis are allowed to transmit through a means 101 selectively transmitting the light rays, and a shading time lag along the flux of light from respective light sources is sensed by a photosensor disposed at the rear of the means for selectively transmitting the light rays, whereby the spherical power, the cylinder power and the angle of cylinder axis are calculated.

Those automatic lens metters, however, are attended with the following drawbacks.

The firstly mentioned automatic lens meter requires two rotary mechanisms for providing a predetermined rotation, resulting in a complicated construction, and, hence, assembly, adjustment and inspection are time-consuming. Furthermore, a measuring accuracy is impaired, particularly in the case where the ruling fluctuates in the radial direction. In order to provide an improved measuring accuracy, special parts such as laser light sources must be employed, and/or permissible error of respective components must be small. Thus, an expensive automatic lens meter is bound to result.

In the second mentioned automatic lens meter, the shading means is a rotary disc consisting of transparent portions and opaque portions, each of which has a peculiarly curved pattern, and the polar coordinates of a point at which the light ray crosses the rotary disc is obtained from an angle of rotation of the rotary disc. For this reason, the peculiar curved patterns of the rotary disc must be highly precise, in order to achieve the practical accuracy. In order to maintain the rectangular coordinate uniformly accurate over the entire zone of the flux of light being shaded, because a reading must be converted into rectangular coordinates, precision of the curved pattern must be enhanced toward the center of rotation of the rotary disc. Furthermore, the rotary disc must be disposed vertically highly accurately with respect to the optical axis as well as a rotary shaft of a motor. The rotary shaft of the motor must exactly meet the origin of the polar coordinates of the rotary disc. However, a fluctuation in the radial direction of the rotary means occasionally occurs, with the failure to match the origin of the polar coordinates with the rotary shaft of the motor, and the origin of the polar coordinates is rotated, resulting in inaccurate measurement.

The second automatic lens meter is different from the first lens meter in the points that the white light source is employed and only a single rotary mechanism is incorporated. So far as these points are concerned, the manufacturing cost would be reduced to some extent. However, use of the shading means of a peculiar configuration increases a cost to an extent more than that.

SUMMARY OF THE INVENTION

In an attempt to solve the above-described drawbacks, it is an object of the present invention to provide an automatic lens meter, which is easy to assemble, adjust and operate for inspection of a lens, and which is less costly to manufacture.

BRIEF DESCRIPTION OF THE DRAWINGS

FIGS. 1a and 1b illustrate the principle of a known lens meter;

DESCRIPTION OF THE PREFERRED EMBODIMENTS

Figure 2:
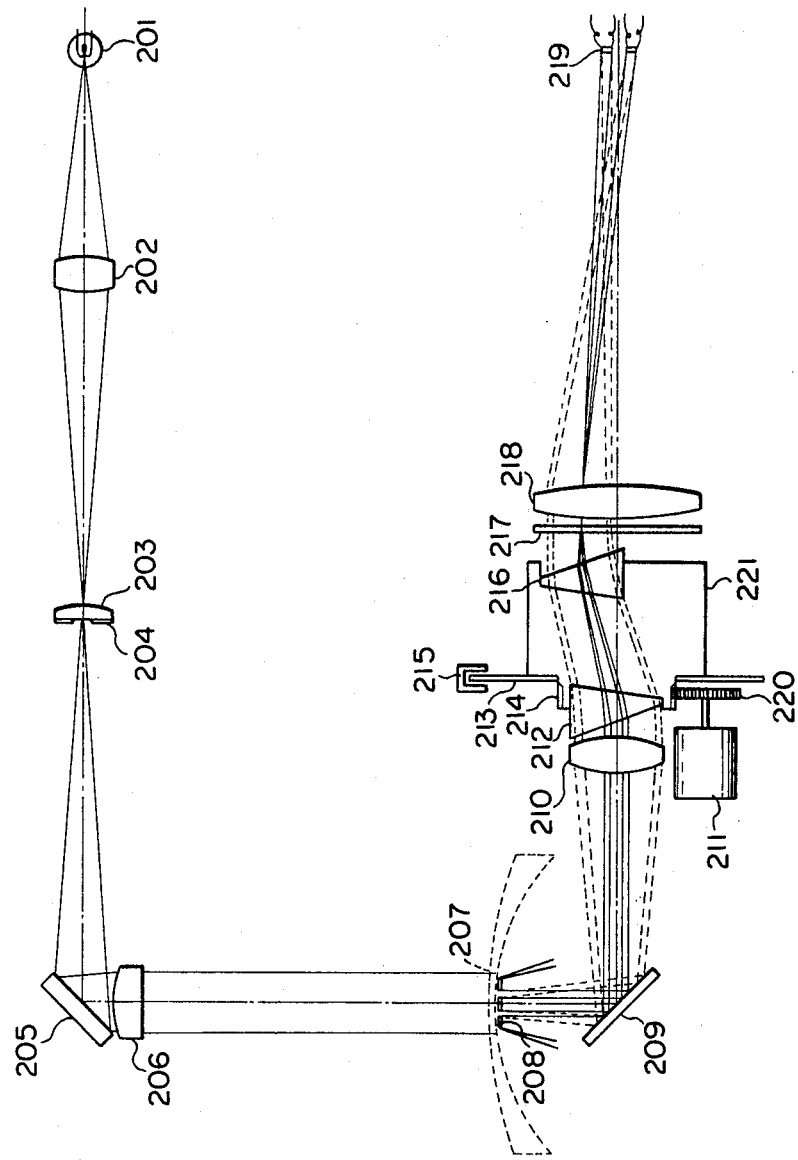
FIG. 2 diagrammatically shows the optical system of an automatic lens meter according to the present invention.

Referring to FIG. 2, there are provided in the upper part of FIG. 2 a light source 201, a condensing lens 202 for focusing the light from the light source 201 onto a single-pin-hole disc 204, a relay lens 203 to which the single-pin-hole disc 204 is secured, a cold mirror 205 for absorbing only the infrared rays to reflect visible rays downward, as viewed in FIG. 2, and a collimator 206 for producing parallel flux of light from the light rays reflected on the cold mirror 205 and focusing an image on the single-pin-hole disc 204. In the lower part of FIG. 2, there are provided a lens 207 being inspected, a multiple-pin-hole disc 208 for stopping thereon the lens being inspected, a reflecting mirror 209 for directing the light to the right, as viewed in FIG. 2, an objective lens 210 having a first focal point on the multiple-pin-hole disc 208 or in its vicinity, a collector lens 218 for collecting the flux of light, and a photosensor 219 which is in a conjugated relation to the multiple-pin-hole disc 208, with respect to the objective lens 210 and the collector lens 218. Elements constituting the photosensor 219 are arranged coaxially with the objective lens 210 and the collector lens 218 in a manner that individual elements can detect the light rays emitted from the respective pin holes of the multiple-pin-hole disc 208 independently of each other. Two deviated prisms 212 and 216, respectively, have substantially an equal apical angle and are attached to a rotary frame 221 at a given spacing from each other, with one prism inverted vertically with respect to the optical axis. The rotary frame 221 is rotatable about the optical axis of, for example, the objective lens 210 by a gear 214 maintained in mesh with a gear 220 mounted on a shaft of a motor 211. A rotary encoder 213 is attached to one end of the rotary frame 221 with the center thereof coincident with the optical axis, and has a photointerrupter 215 fitted on part of the outer circumference thereof. A shading disc 217 is interposed between the rotary frame 221 and the collector lens 218 in a portion in which pin-hole images of the single-pin-hole 204 are formed, that is, in the second focal point of the objective lens 210.

In operation, the light rays from the light source 201 are focused by the condensing lens 202, and thence, pass through the pin hole of the single-pin-hole disc 204. The light rays are directed on the cold mirror 205 to be reflected downward, as viewed in FIG. 2, and enter the collimator lens 206. The light rays are emitted in the form of parallel flux of light from the collimator lens 206 and enter the multiple-pin-hole disc 208. The light rays passing through the multiple-pin-hole disc 208 enter the objective lens 210. The light rays emitted from the objective lens 210 are refracted by the first deviated prism 212 and the second deviated prism 216 to reach the shading disc 217. A pin-hole image of the single-pin-hole disc 204 is formed on the shading disc 217. The light rays transmitted through the shading disc 217 are collected by the collector lens 218 to enter the photosensor 219. Respective elements constituting the photosensor 219 detect the light rays emitted from respective pin-holes of the multiple-pin-hole disc 208 individually and independently of each other. When the rotary frame 221 is rotated, the deviated prisms 212 and 216 are rotated. Consequently, the pin-hole image of the single-pin-hole disc 204 which has been formed on the shading disc 217 off the optical axes of the lenses 210 and 218 scans circularly on the disc 217 at a predetermined radius. An angle of rotation of the rotary frame 221 is read by the rotary encoder 213 and the photointerrupter 215 which are attached to the rotary frame 221.

Figures 3A, 3B:
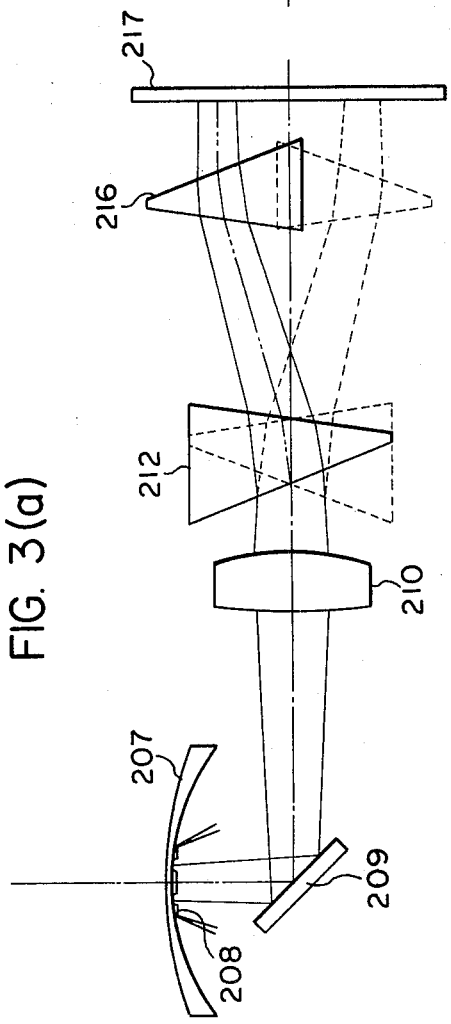
FIGS. 3a and 3b are enlarged explanatory views of an essential part of FIG. 2.
Figure 4:
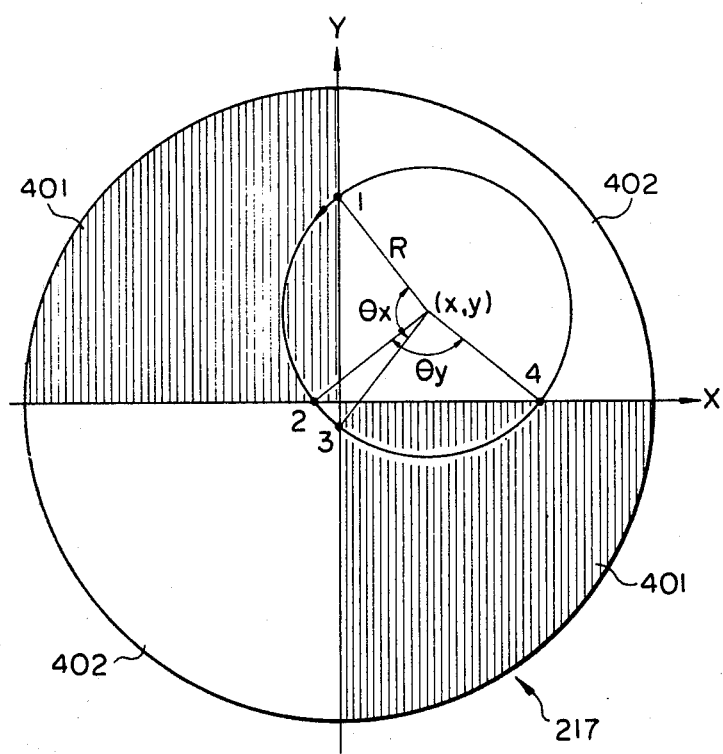
FIG. 4 is an explanatory view of a shading means, for explanation of the operation thereof.

FIGS. 3 and 4 illustrate the shading means according to the present invention. The shading means is constituted by the pair of deviated prisms 212 and 216, the shading disc 217, a mechanism for rotating the rotary frame 221 and a mechanism for reading an angle of rotation of the rotary frame 221.

In FIG. 3, the essential part of FIG. 2 is shown in enlargement, with the lens 207 being inspected placed in the optical system. In this embodiment, the multiple-pin-hole disc 208 is a circular member having plurality of pin holes of about 0.5 mm in radius provided on the circumference of about 3 mm in radius which has a center on the optical axis thereof at an angular spacing of 90° from each other. The multiple-pin-hole disc may be reproduced on a photographic dry plate. The multiple-pin-hole disc is not limitative in material and configuration to the above described, as long as the disc is formed of a material having no likelihood that the light reflected on the shading disc 217 and exerting an influence on measurement is re-reflected on the multiple-pin-hole disc 208.

Assuming that the lens 207 being inspected is a negative lens, four light rays emitted from the multiple-pin-hole disc 208 are diverged to enter the objective lens 210. The light rays emitted from the objective lens 210 run in parallel alone, forming a consistent angle with respect to the optical axis, even through the lens 207 being inspected of any diopters is placed on the lens stop.

Since two deviated prisms having an equal apical angle are so arranged that one prism is inverted vertically with respect to the optical axis, thus directing the apical angle of one prism opposite to the apical angle of the other prism, then these two prisms are deemed to be equivalent to parallel plane plates tilted at a predetermined angle with respect to the optical axis. Therefore, the light rays coming from the objective lens into the first deviated prism 212 at a certain angle thereto are consistently emitted at a certain angle from the second deviated prism 216. In the event of change in the height from the optical axis, of the light ray emitted from the objective lens 210, if the angle of emission is constant, then the light rays emitted from the second deviated prism 216 move in parallel by a distance equivalent to a changed height. When these two deviated prisms 212 and 216 are rotated about the optical axis, four pin-hole images of the single-pin-hole disc 204 circularly scan on the shading disc 217 at a given radius, without changing a positional relationship among these images, as shown in FIG. 3(b). The circularly scanning radius is a characteristic value which is determined by angles formed by respective faces of the deviated prisms 212 and 216 with respect to the optical axis, refractive indexes, thicknesses of respective prisms, and a spacing therebetween, and which by no means changes if an angle of incidence of the incident ray to the first deviated prism 212 is constant, irrespective of the change in the height of the incident ray.

Respective values of the first and second deviated prisms 212 and 216, each of which in one embodiment is made of a glass material having a refractive index of 1.51633 in the wave length of 587.56 mm, are such that, regarding the first deviated prism 212, a apical angle is 30°, an angle of the objective-lens-side face of the prism with respect to the optical axis is 21.5°, and an angle formed by the shading-disc-side face of the prism with respect to the optical axis is 8.5°; and regarding the second prism 216, a apical angle is 30°, an angle formed by the objective-lens-side face with respect to the optical axis is 8.5, and an angle formed by the shading-plate-side face of the prism with respect to the optical axis is 21.5°.

If the positional relationship between the deviated prisms 212 and 216 is constant, the shift of the rotary frame 221 within the verical plane to the optical axis or the shift of the rotary frame in parallel to the optical axis has no significant influence on measurement. Thus, simplicity in structure of the mechanism for rotating the rotary frame 221 results, without a need of paying any consideration to design of the mechanism for moving the rotary frame in the radial direction as well as in the thrust direction. With a view to preventing precession of the rotary frame 221, a sufficient bearing clearance in the rotary frame is provided.

In order to obtain the coordinates of points, at which the four light rays emitted from the multiple-pin-hole disc 208 cross the second focal plane including a second focal point of the objective lens 210, in absence of the deviated prisms 212 and 216, a parallel flat plate having a thickness equivalent to an optical path length accruing from the passing through the deviated prisms 212 and 216, of the light rays is placed vertically with respect to the optical axis. The second focal plane of the objective lens 210 is displaced toward the shading disc 217, so that the points at which respective light rays cross the shading disc 217 coincide with the centers of rotation the rotational loci, as shown in FIG. 3(b). Therefore, the coordinates of the points at which the light rays emitted from the multiple-pin-hole disc 208 cross the second focal plane of the objective lens 210 can be obtained by obtaining the coordinates of the centers of rotational loci.

The rotational locus of one typical light ray will be reviewed with reference to FIG. 4. If there is used the shading disc 217 having opaque portions 401 and transparent portions 402 which are bounded by two lines extending in the directions of the X-axis and Y-axis, the intersecting point of which lies on the optical axis of the objective lens 210, then the coordinates for the center of rotation are obtained by:

$$x = R \cos t \, (\theta x/2)$$

$$y = R \cos t \, (\theta y/2)$$

wherein R is a known value, and the values of $\theta x$ and $\theta y$ are read by the rotary encoder 213 and the photointerrupter 215 which are attached to the circumferential portion of the rotary frame 221. $\theta x$ is obtained from the angles of the locus of rotation of the light ray at the trailing edges of the signals which change from the on-position to the off-position, and $\theta y$ is obtained from the angles of the locus of rotation at the leading edges of the signals which change from the off-position to the on-position. In connection with the rotary encoder 213, a masked slit is provided in the direction of the apical angle of the second diviated prism 216, so as to be utilized as a reset signal. Stated otherwise, $\theta x$ is obtained from the angle 1 through 3, and $\theta y$ is obtained from the angle 2 through 4, as shown in FIG. 4. The photointerrupter 215 is positioned at a point of 45° with respect to the boundary lines crossing each other on the shading disc 217, so that the angles $\theta x$ and $\theta y$ in the preceding cycle are replaced by the angles $\theta x$ and $\theta y$ in the succeeding cycle, at every cycle of rotation of the rotary frame 221 which is caused by the reset signals.

Regarding the pair of deviated prisms 212 and 216, which are most important in the functioning of the shading means described above, the apical angles of these prisms need the machining precision provided by ordinary mass-production, but need not be completely equal to each other, from the practical viewpoint. The inclination accuracy of the second deviated prism relative to the first deviated prism can be on the order of ±30' in a strict sense, and the torsion accuracy can be less than ±1°. The thicknesses of the first and second deviated prisms, a spacing accuracy between these deviated prisms, and a degree of eccentricity of one prism from the other have an influence on the radius of the rotational locus of each light ray scanning on the shading disc 217. The radius of the locus of rotation of respective light rays is primary data of a computer which can be altered with ease. The accuracy in assembly of the deviated prisms 212 and 216 needs nothing more than can be easily realized.

In absence of the lens 207 being inspected, the single-pin-hole disc 204 and the shading disc 217 are conjugate with each other, so that a filament image of the light source 201 can be formed on the shading disc 217. Consequently, it is usual that the influence due to the image in the form of filament is exerted in the step-form on the signals from the photosensor 219 when the light rays are shielded. In this connection, the shading means shields in some cases the light rays from different directions according to a light-ray stricking point, because of the peculiar configuration of the shading means. For this reasons, the flux of light must be uniform, and a bundle of fibers are used as disclosed in Japanese Laid-Open Patent Publication No. 54-14758, thereby removing hot spots of filaments. In the present invention, since the four pin-hole images of the single-pin-holes disc 204 are consistent in their positional relationship, if the direction of winding filaments is inclined substantially at 45° with respect to the boundary lines in the shading disc 217, influence by the hot spots can be eliminated with ease.

In Laid-Open Japanese Patent Publication No. 54-14758, the coordinates of the point of intersection of the light rays on the shading disc are determined by:

$$x = R \cos \theta$$

$$y = R \sin \theta$$

By the primary differentiation, errors of the rectangular coordinates ($\Delta x$, $\Delta y$) is obtained from measuring errors ($\Delta R$, $\Delta \theta$ of the polar coordinates.

$$|\Delta x| = |\Delta R| \cdot |\cos\theta| + |\Delta\theta| \cdot R \cdot |\sin\theta|$$

$$|\Delta y| = |\Delta R| \cdot |\sin\theta| + |\Delta\theta| \cdot R \cdot |\cos\theta|$$

In the shading method according to the present invention, the primary differentiation is:

$$|\Delta x| = |\Delta\theta x| \cdot R \cdot |\sin\theta x|$$

$$|\Delta y| = |\Delta\theta y| \cdot R \cdot |\sin\theta y|$$

wherein R is constant, and $\Delta R = 0$. From this, it is clear that where $\Delta R = 0$, the measuring accuracy is improved.

In assembling and adjusting the automatic lens meter according to the present invention, the main optical system, except for the deviated prisms 212 and 216, are firstly assembled and adjusted, and then the rotary frame unit 221, separately assembled and adjusted, is inserted into the main optical system, with the rotary shaft of the frame meeting the optical axis. Thus, assembly and adjustment are facilitated.

According to the present invention, the two ordinary deviated prisms equal in a apical angle to each other are arranged, with one prism inverted vertically with respect to the optical axis, thus directing the aptical angle of one prism opposite to the apical angle of the other, and these deviated prisms are rotated so that the pin-hole images circularly scan on the shading disc. Thus, there is obtained the automatic lens meter which is improved in accuracy of measurement, and facilitated in assembly, adjustment and operation for inspection.

Furthermore, the use of the shading disc having opaque portions and transparent portions defined by two lines crossing at a right angle with each other provides ease of manufacture, as well as facilitates inspection of a lens. The automatic lens meter incorporates the components of an ordinary configuration, without a need of any component of a peculiar configuration, thus being less costly to manufacture.

In addition to the pair of deviated prisms, a reflecting member may be provided, fulfilling the same function as described above.

What is claimed is:

1. An automatic lens meter comprising:
   means for causing parallel flux of light to enter a lens being inspected;
   a multiple-pin-hole disc having at least three pin holes and disposed adjacent to a light-emission end of said lens being inspected on a first focal point of an objective lens or in the vicinity thereof;
   a lens set consisting of said objective lens and a collector lens and adapted to collect light rays emitted from said multiple-pin-hole disc;
   a photosensor for receiving respective pin-hole images of said multiple-pin-hole disc separately from each other in a position to be conjugate with said multiple-pin-hole disc with respect to said lens set; and
   shading means for obtaining the coordinates of points at which respective light rays emitted from respective pin-holes cross a second plane including a second focal point of said objective lens, according to the shading time lag among respective light rays, characterized in that said shading means comprises:
   a pair of deviated prisms respectively having substantially an equal apical angle, and disposed at a given spacing from each other between said objective lens and said collector lens, with the apical angle of one prism directed opposite to that of the other vertically with respect to the optical axis;
   a rotary mechanism for rotating said pair of deviated prisms about an optical axis of said lens set at a given rate;
   means for reading an angle of rotation of said pair of deviated prisms; and
   a shading disc disposed at the rear of said pair of deviated prisms on the second focal point of said objective lens, and having opaque portions and transparent portions defined by two lines crossing at a right angle to each other at a point on the optical axis of said lens set.

* * * * *